(12) United States Patent
Yoshikawa

(10) Patent No.: US 9,941,778 B2
(45) Date of Patent: Apr. 10, 2018

(54) PERIODIC MAGNETIC FIELD GENERATOR AND ACTUATOR EQUIPPED WITH SAME

(71) Applicant: Panasonic Intellectual Property Management Co., Ltd., Osaka (JP)

(72) Inventor: Tsutomu Yoshikawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 339 days.

(21) Appl. No.: 14/859,230

(22) Filed: Sep. 18, 2015

(65) Prior Publication Data
US 2016/0093428 A1    Mar. 31, 2016

(30) Foreign Application Priority Data

Sep. 25, 2014   (JP) ................................. 2014-195352
Aug. 17, 2015   (JP) ................................. 2015-160269

(51) Int. Cl.
*H02K 41/03*     (2006.01)
*H01F 7/06*      (2006.01)
(Continued)

(52) U.S. Cl.
CPC ......... *H02K 41/031* (2013.01); *H01F 7/0289* (2013.01); *H01F 7/066* (2013.01); *H02K 41/0356* (2013.01)

(58) Field of Classification Search
CPC ........ H02K 33/18; H02K 35/02; H02K 35/04; H01F 7/0289; H01F 7/066
(Continued)

(56) References Cited

U.S. PATENT DOCUMENTS 5,345,206 A * 9/1994 Morcos ................... H01F 7/066
                                                              310/13
6,316,849 B1 * 11/2001 Konkola ............. G03F 7/70758
                                                              310/12.06
(Continued)

FOREIGN PATENT DOCUMENTS

JP          10027699 A * 1/1998
JP        2004-041715   2/2004
(Continued)

*Primary Examiner* — Jeremy Luks
(74) *Attorney, Agent, or Firm* — Pearne & Gordon LLP

(57) ABSTRACT

The periodic magnetic field generator includes a flat-shaped first yoke, and a plurality of main permanent magnets, an auxiliary permanent magnet, and a side permanent magnet on the first yoke. The plurality of main permanent magnets are magnetized in a first direction of generating magnetic fields, the direction being perpendicular to the first yoke, and disposed such that orientations of the magnetization become opposite alternately in the first direction. The auxiliary permanent magnet is magnetized in a second direction perpendicular to side faces of the plurality of main permanent magnets, and placed between the side faces of the main permanent magnets. The side permanent magnet is magnetized in a third direction perpendicular to the first direction, and disposed so as to cover end faces of the main permanent magnets and the auxiliary permanent magnet, the end faces being perpendicular to the side faces of the main permanent magnets.

11 Claims, 19 Drawing Sheets

(51) Int. Cl.
  *H01F 7/02* (2006.01)
  *H02K 41/035* (2006.01)
(58) Field of Classification Search
  USPC .................... 310/12.16, 12.24–12.26, 15, 17
  See application file for complete search history.

(56) References Cited

U.S. PATENT DOCUMENTS

| | | |
|---|---|---|
| 8,009,001 B1 | 8/2011 | Cleveland |
| 8,917,154 B2 * | 12/2014 | Fullerton .............. H01F 7/0278 335/296 |
| 8,937,521 B2 * | 1/2015 | Fullerton .............. H01F 7/0278 335/296 |
| 2005/0151539 A1 | 7/2005 | Aoki et al. |
| 2008/0224557 A1 | 9/2008 | Cleveland |
| 2011/0012440 A1 | 1/2011 | Toyota et al. |

FOREIGN PATENT DOCUMENTS

| | | | |
|---|---|---|---|
| JP | 2007110822 A | * | 4/2007 |
| JP | 2007312449 A | * | 11/2007 |
| JP | 2011-024379 | | 2/2011 |

* cited by examiner 3B-3B 4B-4B 7B-7B

FIG. 18

|  | Thrust (N) | Ratio to Comparative Example 2 |
|---|---|---|
| Embodiment 3 | 0.7373 | 113.2% |
| Embodiment 4 | 0.7487 | 114.9% |
| Embodiment 5 | 0.7628 | 117.1% |
| Comparative Example 2 | 0.6514 | - |

PERIODIC MAGNETIC FIELD GENERATOR AND ACTUATOR EQUIPPED WITH SAME

BACKGROUND

1. Technical Field

The present disclosure relates to a periodic magnetic field generator having main permanent magnets magnetized in a direction of generated magnetic field, and auxiliary permanent magnets magnetized in a direction different from the main permanent magnets, wherein the main permanent magnets and the auxiliary permanent magnets are disposed alternately. The present disclosure also relates to an actuator equipped with the periodic magnetic field generator.

2. Description of the Related Art

Periodic magnetic field generators are used as devices that generate magnetic fields for driving various actuators such as image-capturing devices equipped with camera-shake correction mechanism, automatic focus (AF) mechanism, zoom mechanism and the like, robots, and motors. There is a growing demand in recent years for the periodic magnetic field generators to generate magnetic fields of increased density of magnetic flux in order to obtain higher driving force.

Patent Literature 1, for instance, discloses a periodic magnetic field generator including a back yoke, main-pole permanent magnets having upward and downward directions of magnetization, auxiliary-pole permanent magnets having rightward and leftward directions of magnetization, and soft magnetic materials disposed on magnetic-field generation sides of the main-pole permanent magnets. According to this periodic magnetic field generator, the influence of magnetic saturation in the magnetic circuit is alleviated by the soft magnetic materials because the generated magnetic field is directed upward (i.e., Z-axis), thereby achieving an increase in the generated magnetic field as compared to a structure having only a Hull Bach magnet array.

CITATION LIST

Patent Literature

PTL 1: Japanese Patent Unexamined Publication, No. 2011-24379

SUMMARY

The conventional periodic magnetic field generator described above, however, has the following problem. That is, the periodic magnetic field generator disclosed in the above publication results in an increase in volume and weight of the magnet unit as well as complexity of the structure due to the additional soft magnetic materials, although the addition of the soft magnetic materials can increase generated magnetic field.

The present disclosure is aimed at providing a periodic magnetic field generator and an actuator equipped with the magnetic field generator that are capable of raising the magnetic flux density with a simple structure and without increasing a volume and weight of the magnet unit.

The periodic magnetic field generator according to the present disclosure includes a flat-shaped first yoke, a plurality of main permanent magnets, an auxiliary permanent magnet, and a side permanent magnet. The plurality of main permanent magnets are magnetized in a first direction of generating magnetic fields, the direction being perpendicular to the first yoke, and disposed on the first yoke such that orientations of the magnetization become opposite alternately in the first direction. The auxiliary permanent magnet is magnetized in a second direction that is perpendicular to side faces of the plurality of main permanent magnets, and placed between the side faces of the main permanent magnets on the first yoke. The side permanent magnet is magnetized in a third direction that is perpendicular to the first direction, and disposed on the first yoke so as to cover end faces of the main permanent magnets and the auxiliary permanent magnet, the end faces being perpendicular to the side faces of the main permanent magnets.

According to the periodic magnetic field generator of the present disclosure, it becomes possible to increase the magnetic flux density without increasing volume, weight and size of the magnet unit.

BRIEF DESCRIPTION OF DRAWINGS

FIG. 18 is a comparison table of thrusts of the actuators according to the embodiments 3 to 5 and comparative example 2.

DESCRIPTIOM OF EMBODIMENTS

First Exemplary Embodiment

Description is provided about a periodic magnetic field generator according to a first exemplary embodiment of the present disclosure by referring to FIG. 1 to FIG. 5C as follows.

[Overall Structure of Periodic Magnetic Field Generator 10a]

Figure 1:
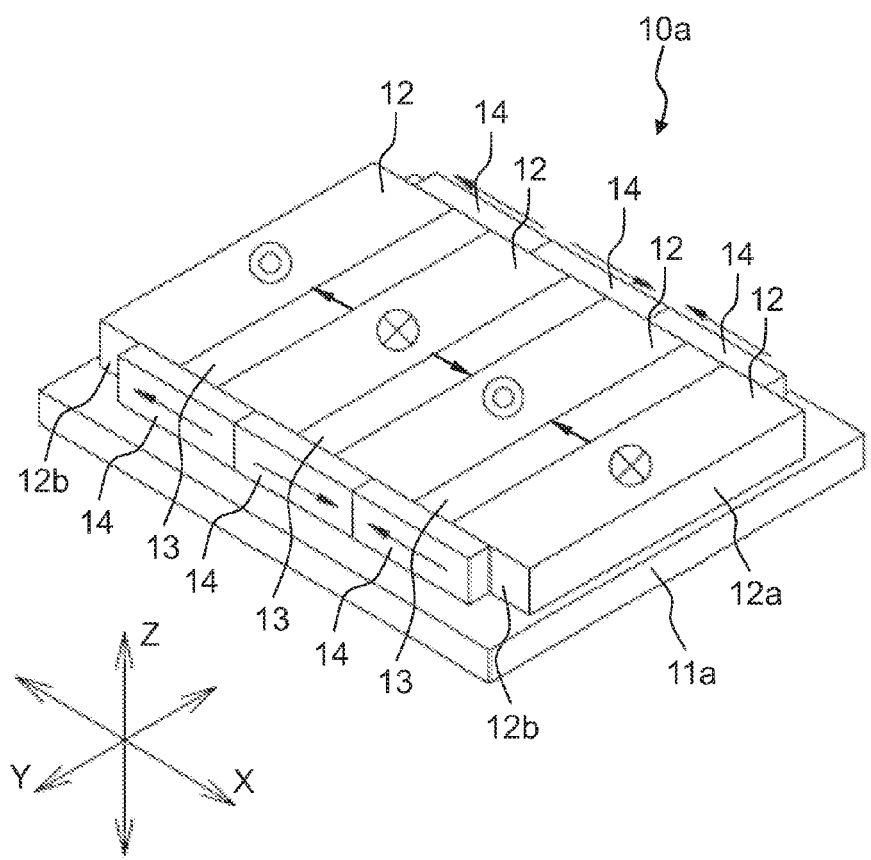
FIG. 1 is a perspective view showing an overall structure of a periodic magnetic field generator according to a first exemplary embodiment.

Periodic magnetic field generator 10a according to the present embodiment is a device that constitutes a drive unit (i.e., actuator) mountable to a camera-shake correction mechanism, an automatic focus mechanism, a zoom mechanism and the like of a digital camera, for instance. Periodic magnetic field generator 10a includes flat-shaped back yoke 11a (i.e., first yoke), a plurality of main permanent magnets 12, auxiliary permanent magnets 13, and side permanent magnets 14, as shown in FIG. 1. Periodic magnetic field generator 10a of the above structure generates magnetic flux of high density in a direction of Z-axis (i.e., first direction) shown in FIG. 1 (the vertical direction in the figure).

Back yoke 11a (i.e., first yoke) is a flat-shaped component, and the above-described plurality of main permanent magnets 12, auxiliary permanent magnets 13 and side permanent magnets 14 are disposed on a flat surface of it. Main permanent magnets 12 are magnetized in a direction (the Z-axis) perpendicular to the flat face of back yoke 11a as shown in FIG. 1. In addition, the plurality of main permanent magnets 12 are disposed on back yoke 11a such that orientations of the magnetization become opposite alternately between upward and downward.

Auxiliary permanent magnets 13 are permanent magnets that are magnetized in a direction of X-axis (i.e., second direction), and they are so disposed as to be sandwiched individually between side faces 12a of adjoining two of the plurality of main permanent magnets 12 disposed on back yoke 11a, as shown in FIG. 1. Side faces 12a of main permanent magnets 12 are thus in contact to side faces 13a of auxiliary permanent magnets 13. Auxiliary permanent magnets 13 are disposed on back yoke 11a such that orientations of the magnetization become opposite alternately in the direction of X-axis. Here, above-described side faces 12a of main permanent magnets 12 refer to surfaces at both ends in the direction of X-axis shown in FIG. 1.

As shown in FIG. 1, side permanent magnets 14 are permanent magnets that are magnetized in the direction of X-axis, as is the case with auxiliary permanent magnets 13. Side permanent magnets 14 are disposed such that they are in contact to end faces at both sides of the plurality of main permanent magnets 12 and auxiliary permanent magnets 13 disposed on back yoke 11a. Side permanent magnets 14 are so disposed as to cover end faces 13b of auxiliary permanent magnets 13 completely, as well as a part of end faces 12b of main permanent magnets 12. Note that not all of side permanent magnets 14, main permanent magnets 12 and auxiliary permanent magnets 13 need to be formed equally in heights (i.e., dimensions in the Z-axis).

Side permanent magnets 14 are disposed on back yoke 11a such that orientations of the magnetization become opposite alternately in the direction of X-axis. Here, the above-described end faces of main permanent magnets 12 and auxiliary permanent magnets 13 refer to surfaces at both ends in a direction of Y-axis shown in FIG. 1.

[Structure of Periodic Magnetic Field Generator 10]

Figure 2A:
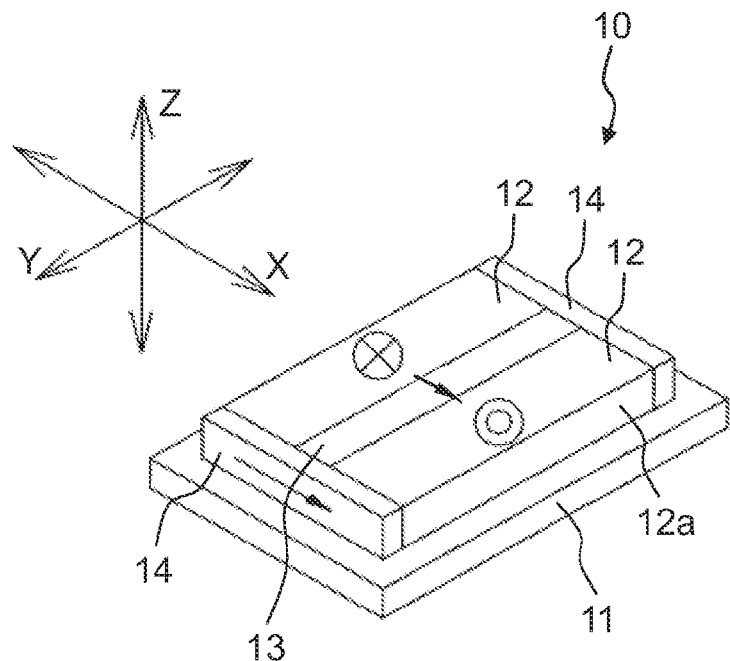
FIG. 2A is a perspective view showing a fundamental unit of the periodic magnetic field generator of FIG. 1.

Periodic magnetic field generator 10 of the present embodiment shown in FIG. 2A is configured as a fundamental unit of periodic magnetic field generator 10a of FIG. 1. That is, periodic magnetic field generator 10 is configured from two main permanent magnets 12, one auxiliary permanent magnet 13 and two side permanent magnets 14 disposed on back yoke 11 as shown in FIG. 2A. Two main permanent magnets 12 produce an upward magnetic field and a downward magnetic field in the direction of Z-axis that is perpendicular to the upper surface of back yoke 11, as shown in FIG. 2A. These main permanent magnets 12 are disposed so as to sandwich auxiliary permanent magnet 13 between side faces 12a that confront each other.

Auxiliary permanent magnet 13 is disposed between side faces 12a of two main permanent magnets 12, and it is magnetized in the direction of X-axis that is perpendicular to side faces 12a of main permanent magnets 12 and parallel to the upper surface of back yoke 11, as shown in FIG. 2A. Auxiliary permanent magnet 13 is smaller in dimension (thickness) in the width direction (i.e., X-axis), and approximately equal in dimension in the longitudinal direction (i.e., Y-axis) when compared with main permanent magnet 12. End faces 12b of two main permanent magnets 12 and end faces 13b of auxiliary permanent magnet 13 are covered with side permanent magnets 14 at both sides in the direction of Y-axis as shown in FIG. 2A.

Side permanent magnets 14 are magnetized in the direction of X-axis that is perpendicular to side faces 12a of main permanent magnets 12 and parallel to the upper surface of back yoke 11, in the same manner as auxiliary permanent magnet 13, as shown in FIG. 2A. Thus, the orientation of magnetization of side permanent magnets 14 is same as that of auxiliary permanent magnet 13. In addition, side permanent magnets 14 are formed to have a dimension in the longitudinal direction (i.e., X-axis) approximately equal to the sum of widthwise dimensions (thicknesses) of two main permanent magnets 12 and one auxiliary permanent magnet 13.

However, the dimension in the longitudinal direction of side permanent magnets 14 may be somewhat shorter than the sum of the widthwise dimensions (thicknesses) of two main permanent magnets 12 and one auxiliary permanent magnet 13.

[Structure as Actuator 50]

Periodic magnetic field generator 10 of the present embodiment constitutes actuator 50 (refer to FIG. 5A et al.) in combination with yoke 11b (i.e., second yoke; refer to FIG. 5A et al.) and voice coil 15 (refer to FIG. 2B et al.) which will be described later.

Figure 2B:
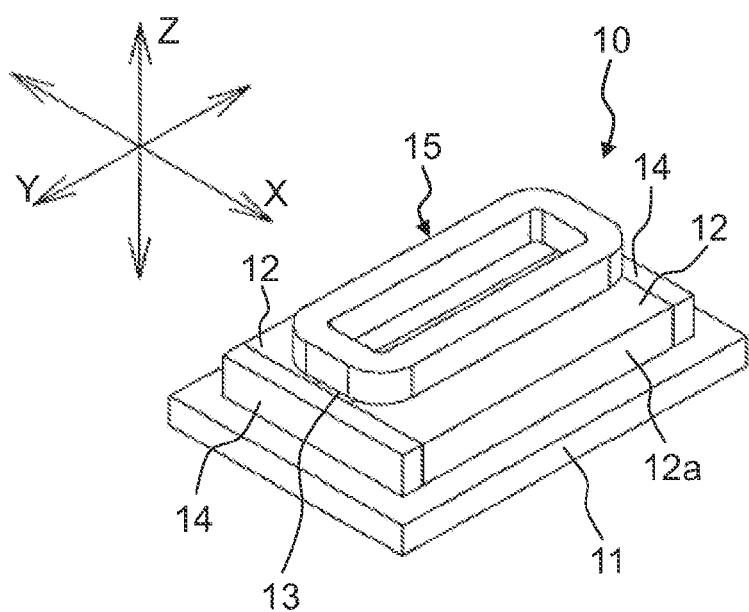
FIG. 2B is a perspective view showing placement of the periodic magnetic field generator and a voice coil in an actuator according to the first exemplary embodiment.

As shown in FIG. 2B, voice coil 15 is disposed immediately above periodic magnetic field generator 10 shown in FIG. 2A with a predetermined clearance, to produce a driving force as actuator 50. In other words, voice coil 15 is disposed in a space at the opposite side of back yoke 11, such that voice coil 15 and back yoke 11 sandwich main permanent magnets 12, auxiliary permanent magnet 13 and side permanent magnets 14.

Voice coil 15 causes a driving force to occur between voice coil 15 and periodic magnetic field generator 10, with one of them as being a stationary side and the other as being a movable side, owing to a force (i.e., Lorentz force) that a charged particle flowing in voice coil 15 receives from the magnetic field of periodic magnetic field generator 10. It is for this force that, when actuator 50 is used as an actuator of a camera-shake correction mechanism in a digital camera, for instance, a movable side member can be driven along a plane perpendicular to an optical axis.

Figure 3A:
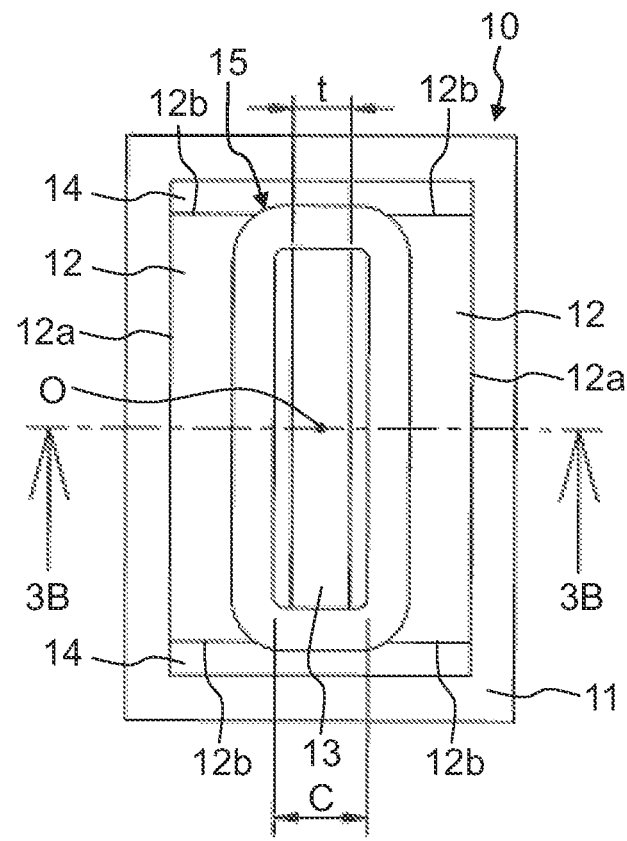
FIG. 3A is a plan view of the actuator shown in FIG. 2B.
Figure 3B:
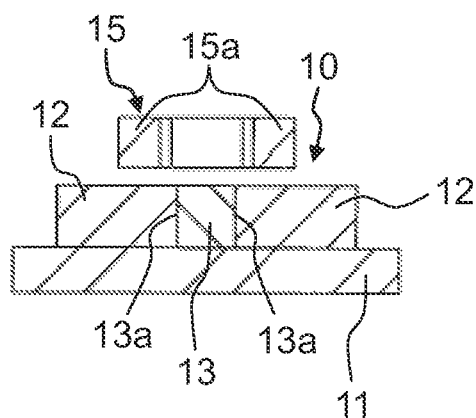
FIG. 3B is a cross-sectional view taken along a line 3B-3B shown in FIG. 3A.

In specific, voice coil 15 is formed of coil 15a wound into generally a rectangular shape in a plan view, and it is so disposed that center O of circularly-wound coil 15a is located above auxiliary permanent magnet 13 as shown in FIG. 3A and FIG. 3B. In addition, voice coil 15 is so disposed that a longitudinal direction of it is aligned with a longitudinal direction of periodic magnetic field generator 10, as shown in FIG. 3A.

Here, actuator 50 of the present embodiment is configured to satisfy the following relational expression (1), where C is an inner width of voice coil 15, s is a range of driving stroke at both plus and minus sides (±s), or, a magnitude that voice coil 15 can be driven by a force received from periodic magnetic field generator 10, and t is a thickness of auxiliary permanent magnets 13 in FIG. 3A:

$$C \geq t + s \quad (1)$$

Figure 4A:
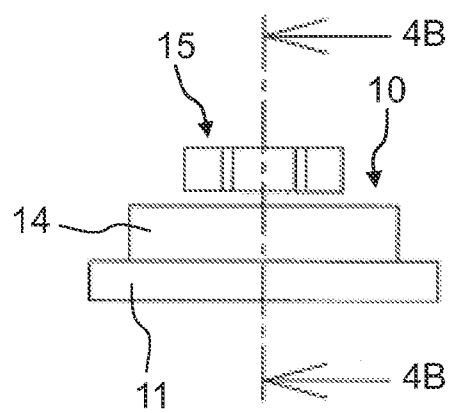
FIG. 4A is a front view of the actuator shown in FIG. 2B.
Figure 4B:
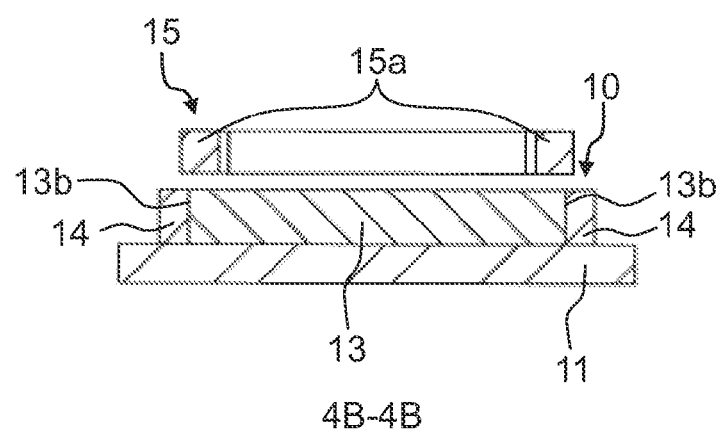
FIG. 4B is a cross-sectional view taken along a line 4B-4B shown in FIG. 4A.

Voice coil 15 is so disposed that the center of it stays above the center of periodic magnetic field generator 10 in a front view, as shown in FIG. 4A. Furthermore, in a plan view, voice coil 15 is disposed such that a wound portion of coil 15a is located above end faces 12b of main permanent magnets 12 and end faces 13b of auxiliary permanent magnet 13 where side permanent magnets 14 are in contact with, as shown in FIG. 3A and FIG. 4B.

Figure 5A:
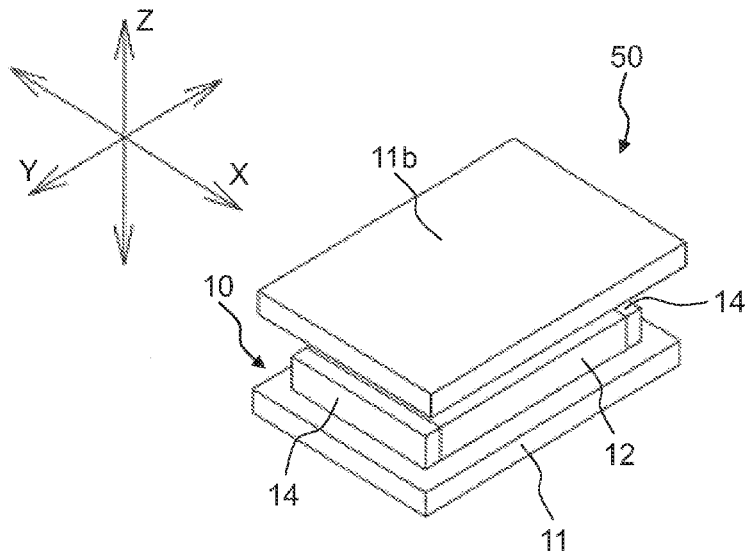
FIG. 5A is a perspective view of another actuator according to the first exemplary embodiment.
Figure 5B:
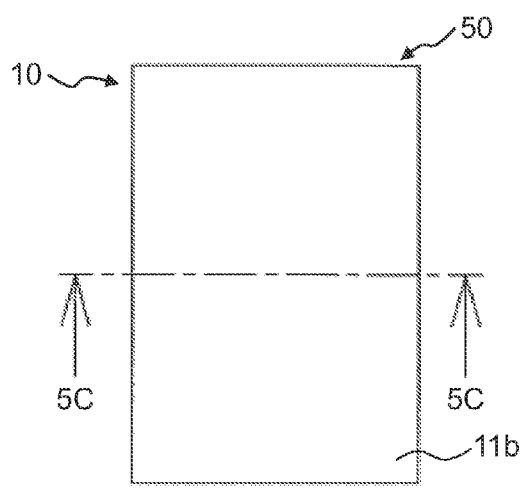
FIG. 5B is a plan view of the actuator shown in FIG. 5A.
Figure 5C:
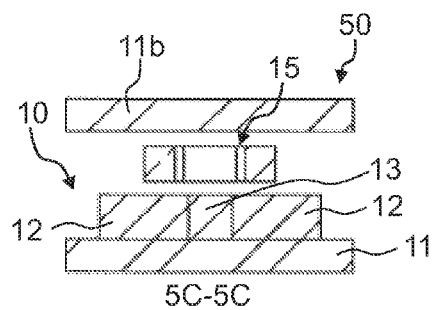
FIG. 5C is a cross-sectional view taken along a line 5C-5C shown in FIG. 5B.

FIG. 5A is a perspective view of actuator 50. As shown in FIG. 5A, yoke 11b is disposed immediately above voice coil 15 located above periodic magnetic field generator 10 in the Z-axis, and, in combination with back yoke 11, it constitutes upper and lower surfaces of actuator 50. Yoke 11b is a flat-shaped component of approximately the same size as back yoke 11 that constitutes periodic magnetic field generator 10, and is disposed so that main permanent magnets 12, auxiliary permanent magnet 13, side permanent magnets 14 and voice coil 15 are sandwiched between yoke 11b and back yoke 11, as shown in FIG. 5B and FIG. 5C. Yoke 11b is disposed immediately above voice coil 15 with a predetermined clearance as shown in FIG. 5C.

It is by virtue of the simple structure shown in FIG. 5A to FIG. 5C that actuator 50 of the present embodiment can increase magnetic flux density in the direction of Z-axis without increasing a number of permanent magnets.

Second Exemplary Embodiment

Description is provided about actuator 51 according to a second exemplary embodiment of the present disclosure by referring to FIG. 6A to FIG. 7B, as follows. Actuator 51 of the present embodiment differs from actuator 50 of the first embodiment in an aspect that two periodic magnetic field generators 10 are so disposed as to confront each other with voice coil 15 sandwiched between them in the direction of Z-axis, whereas actuator 50 has an asymmetrical structure with respect to the Z-axis. Note that same reference marks are used to designate individual components that constitute actuator 51 when they have same functions and shapes as those of the first embodiment, and their details will be omitted.

Figure 6A:
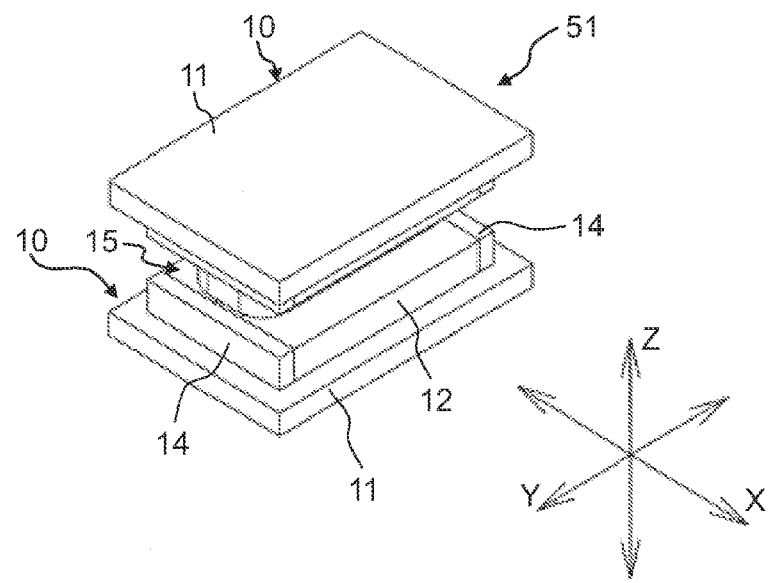
FIG. 6A is a perspective view of an actuator according to a second exemplary embodiment.
Figure 6B:
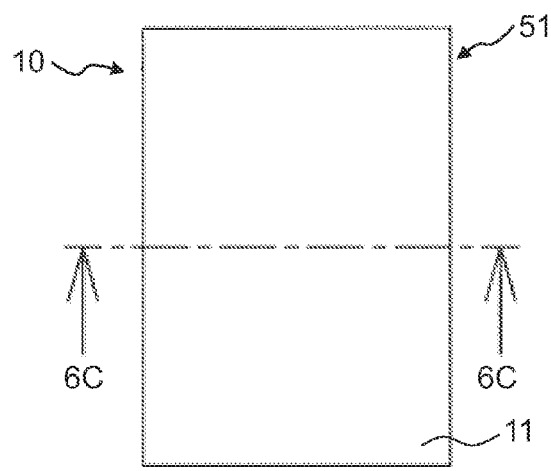
FIG. 6B is a plan view of the actuator shown in FIG. 6A.
Figure 6C:
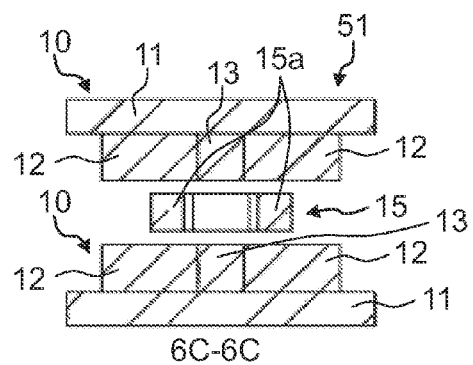
FIG. 6C is a cross-sectional view taken along a line 6C-6C shown in FIG. 6B.

Actuator 51 of the present embodiment is configured from periodic magnetic field generators 10 having structures that are equivalent to each other and so disposed that their side surfaces carrying main permanent magnets 12 and the like confront each other vertically in the direction of Z-axis, as shown in FIG. 6A to FIG. 6C. It is noted however that the description in this disclosure is not intended to set a limitation that the two periodic magnetic field generators disposed to confront vertically have an equivalent structure.

One of periodic magnetic field generators 10 at the upper side in the Z-axis is disposed with a predetermined clearance to voice coil 15, as shown in FIG. 6C. More specifically, periodic magnetic field generator 10 at the upper side is disposed in a manner that main permanent magnets 12, auxiliary permanent magnet 13 and side permanent magnets 14 confront an upper surface of voice coil 15 with the predetermined clearance. Moreover, periodic magnetic field generators 10 that vertically confront each other are so disposed that they overlap one another with reference to a center position of voice coil 15, as shown in FIG. 6B.

Figure 7A:
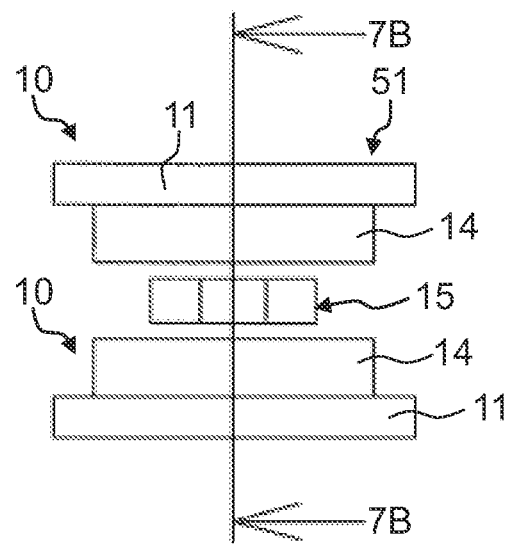
FIG. 7A is a front view of the actuator shown in FIG. 6A.
Figure 7B:
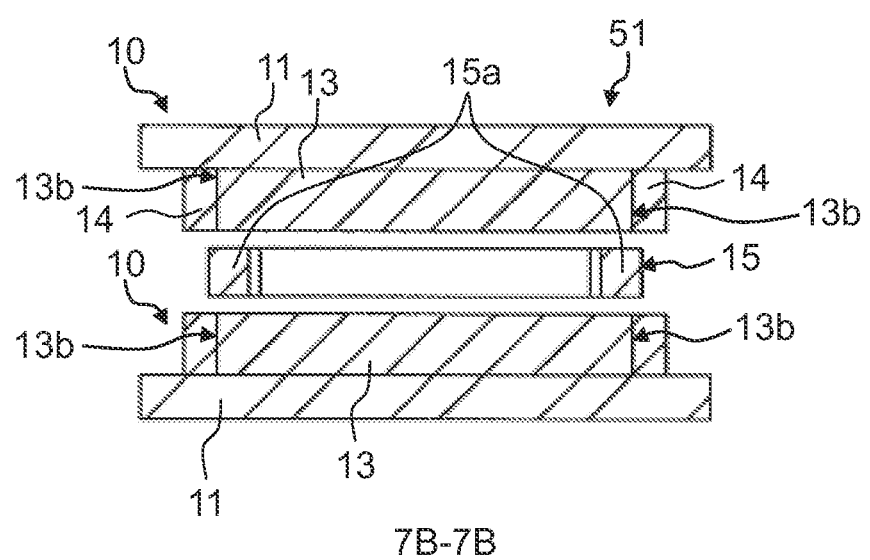
FIG. 7B is a cross-sectional view taken along a line 7B-7B shown in FIG. 7A.

FIG. 7A is a front view of actuator 51 shown in FIG. 6A, and FIG. 7B is a cross-sectional view taken along a line 7B-7B shown in FIG. 7A. As illustrated in FIG. 7A and FIG. 7B, a wound portion of coil 15a is located in vicinities immediately above and below end faces 13b of auxiliary permanent magnet 13 where side permanent magnets 14 are in contact with. Likewise, the wound portion of coil 15a is located in vicinities immediately above and below end faces 12b of main permanent magnets 12 where side permanent magnets 14 are in contact with (refer to FIG. 3A).

Actuator 51 of the present embodiment can further increase the magnetic flux density in the direction of Z-axis by virtue of the structure shown in FIG. 6A to FIG. 7B in which periodic magnetic field generators 10 are disposed in positions to confront each other vertically.

Third Exemplary Embodiment

Description is provided about periodic magnetic field generator 20a according to a third exemplary embodiment by referring to FIG. 8, as follows. Periodic magnetic field generator 20a of the present embodiment differs from periodic magnetic field generator 10a of the first exemplary embodiment in an aspect that side permanent magnets 24 disposed in a manner to cover end faces of a plurality of main permanent magnets 22 and auxiliary permanent magnets 23 on back yoke 21 are magnetized in the direction of Y-axis that is perpendicular to the end faces of main permanent magnets 22 and auxiliary permanent magnets 23.

In periodic magnetic field generator 10a of the first embodiment, to be specific, side permanent magnets 14 are magnetized in the direction of X-axis that is the same direction as auxiliary permanent magnets 13, as shown in FIG. 1. In periodic magnetic field generator 20a of the present embodiment, on the other hand, side permanent magnets 24 are magnetized in the direction of Y-axis that is perpendicular to both of the directions of magnetization (i.e., Z-axis and X-axis) of main permanent magnets 22 and auxiliary permanent magnets 23, as shown in FIG. 8. In addition, a plurality of side permanent magnets 24 are disposed on back yoke 21 such that their orientations of magnetization become opposite alternately in the direction of Y-axis.

Side permanent magnets 24 are disposed such that they are in contact to end faces at both sides of the plurality of main permanent magnets 22 and auxiliary permanent magnets 23 disposed on back yoke 21. Side permanent magnets 24 are so disposed as to cover the whole of the end faces of main permanent magnets 22 and auxiliary permanent magnets 23 in the direction of X-axis. Note that not all of side permanent magnets 14, main permanent magnets 12 and auxiliary permanent magnets 13 need to be formed equally in heights (i.e., dimensions in the Z-axis). Here, the above-described end faces of main permanent magnets 22 and auxiliary permanent magnets 23 refer to surfaces at both ends in the direction of Y-axis shown in FIG. 8.

Figure 8:
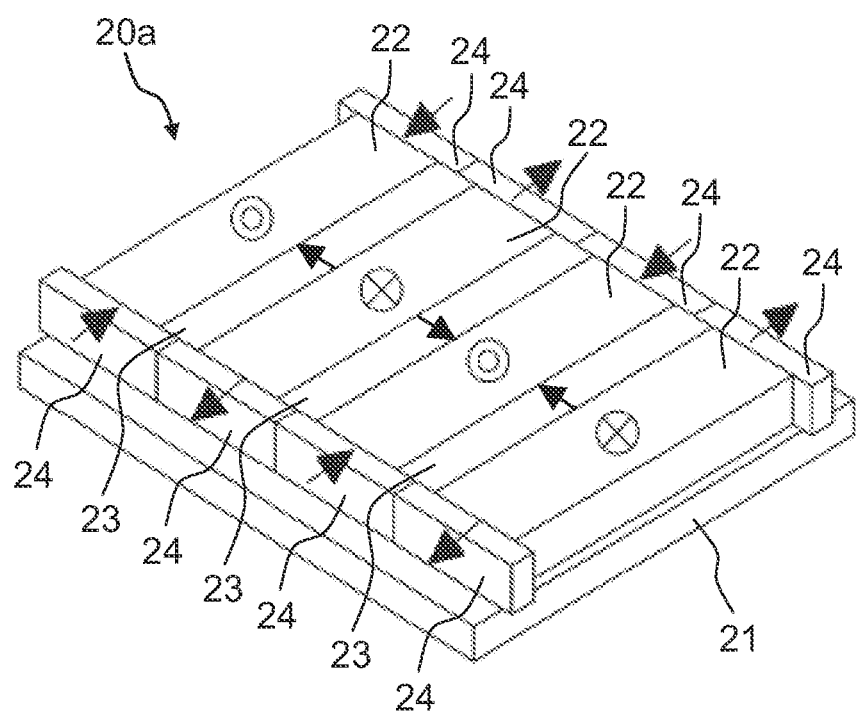
FIG. 8 is a perspective view of a periodic magnetic field generator according to a third exemplary embodiment.
Figure 8:
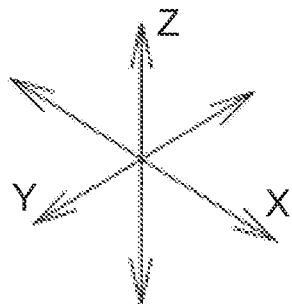

In FIG. 8, although conjoining side permanent magnets 24 cover the end faces of main permanent magnets 22 and auxiliary permanent magnets 23 while being in contact with one another, they may have a space smaller than a dimension (thickness) in the width direction (i.e., the X-axis) of auxiliary permanent magnets 23 between the adjoining pair of side permanent magnets 24.

According to periodic magnetic field generator 20a of the present embodiment, the magnetic flux density in the Z-axis can be increased further as is the case of periodic magnetic field generator 10a of the first exemplary embodiment.

Fourth Exemplary Embodiment

Figure 9A:
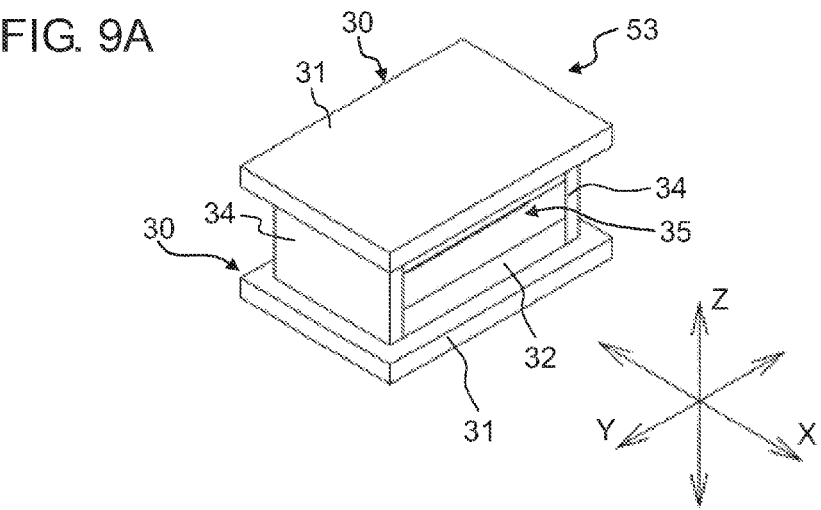
FIG. 9A is a perspective view of an actuator according to a fourth exemplary embodiment.
Figure 9B:
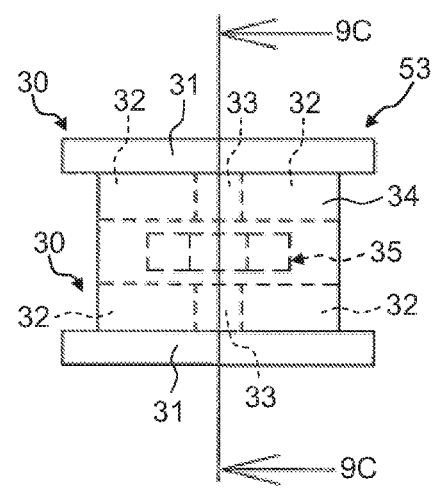
FIG. 9B is a front view of the actuator shown in FIG. 9A.
Figure 9C:
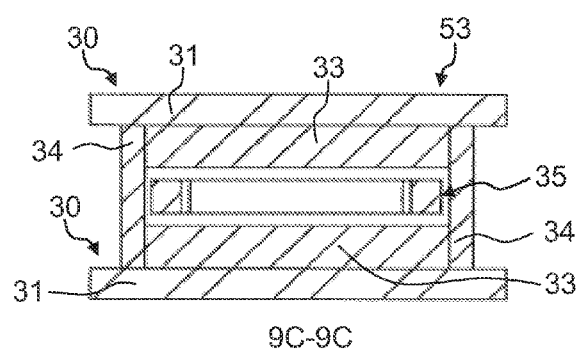
FIG. 9C is a cross-sectional view taken along a line 9C-9C shown in FIG. 9B.

FIG. 9A to FIG. 9C are drawings for help describing actuator 53 according to a fourth exemplary embodiment. Actuator 53 of the present embodiment is similar to actuator 51 of the second embodiment (refer to FIG. 6A et al.) in an aspect that periodic magnetic field generators 30 are so disposed as to confront each other vertically with voice coil 35 sandwiched between them, as shown in FIG. 9A to FIG. 9C. However, actuator 53 of the present embodiment differs from actuator 51 of the second embodiment in another aspect that side permanent magnets 34 are used as common components to constitute two periodic magnetic field generators 30 at upper and lower sides. In other words, side permanent magnets 14 disposed at both upper and lower sides in actuator 51 are integrally formed to serve as side permanent magnets 34 of actuator 53.

More specifically, each of side permanent magnets 34 in actuator 53 of the present embodiment is so disposed as to close a space between back yokes 31 that constitute periodic magnetic field generators 30 disposed to confront vertically as shown in FIG. 9A to FIG. 9C. Upper and lower end faces in the Z-axis of side permanent magnets 34 are in contact to upper and lower back yokes 31. Side permanent magnets 34 are disposed in such positions that they are also in contact with end faces of main permanent magnets 32 and auxiliary permanent magnets 33.

Voice coil 35 disposed into a position to be sandwiched between upper and lower periodic magnetic field generators 30 is thus concealed completely by side permanent magnets 34 when observed from the direction of Y-axis, as shown in FIG. 9B. Voice coil 35 is also in a position that it is sandwiched between side permanent magnets 34 when observed from the direction of X-axis, as shown in FIG. 9C.

According to actuator 53 of the present embodiment, the magnetic flux density in the Z-axis can be increased further by virtue of periodic magnetic field generators 30 disposed to confront each other vertically.

[Verification of Efficiency of the Periodic Magnetic Field Generator]

For the purpose of verifying the efficiencies of the individual periodic magnetic field generators and the actuators according the above-described exemplary embodiments, description is provided by using embodiments 1 and 2, and comparative example 1.

Comparative Example 1

Figure 10:
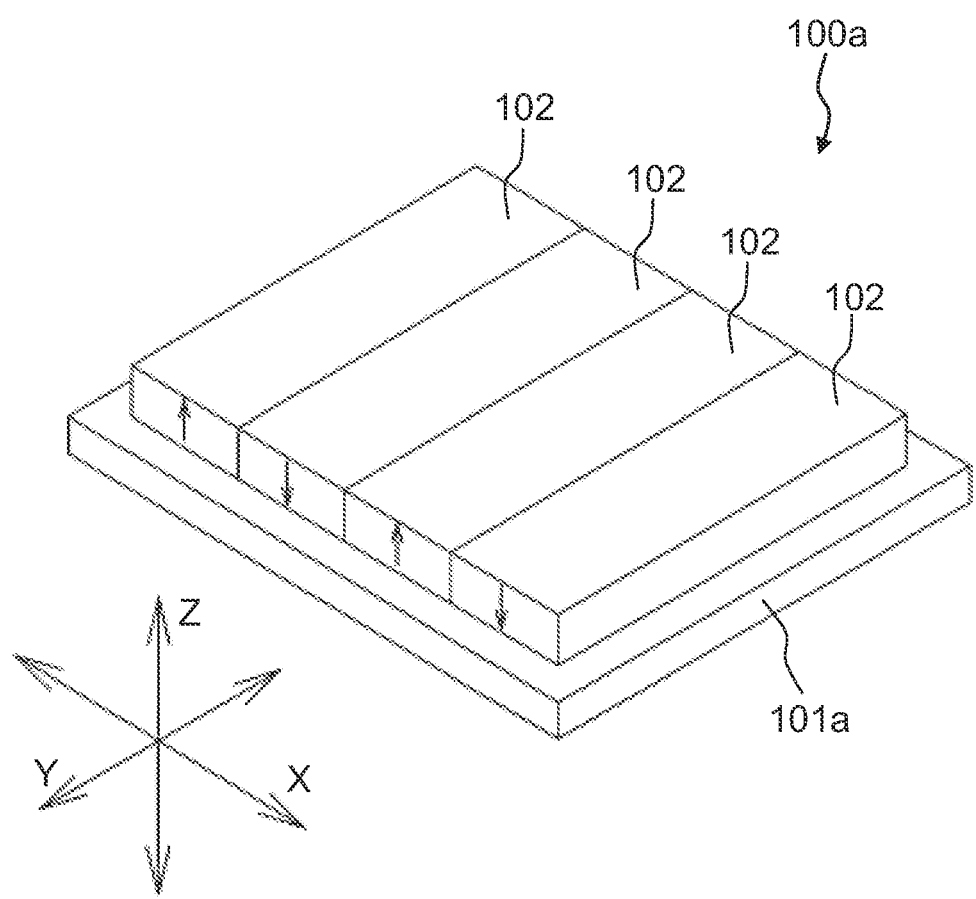
FIG. 10 is a perspective view showing an overall structure of a periodic magnetic field generator that represents comparative example 1.

First, description is provided by referring to FIG. 10 about periodic magnetic field generator 100a as comparative example 1 against periodic magnetic field generator 10 in the first exemplary embodiment described above.

As shown in FIG. 10, periodic magnetic field generator 100a of this comparative example includes back yoke 101a, and a plurality of main permanent magnets 102 disposed on back yoke 101a. Main permanent magnets 102 are disposed on back yoke 101a such that their side faces are in contact to one another. In addition, main permanent magnets 102 are magnetized in an orientation along Z-axis that is perpendicular to an upper surface of back yoke 101a. Main permanent magnets 102 are disposed on back yoke 101a such that orientations of the magnetization of adjoining main permanent magnets 102 become upward and downward directions alternately.

Moreover, periodic magnetic field generator 100a of this comparative example is so configured that a total volume of main permanent magnets 102 disposed on back yoke 101a becomes nearly equal to a total volume of all of the main permanent magnets, the auxiliary permanent magnets and the side permanent magnets of each of the above-described exemplary embodiments.

Figure 11:
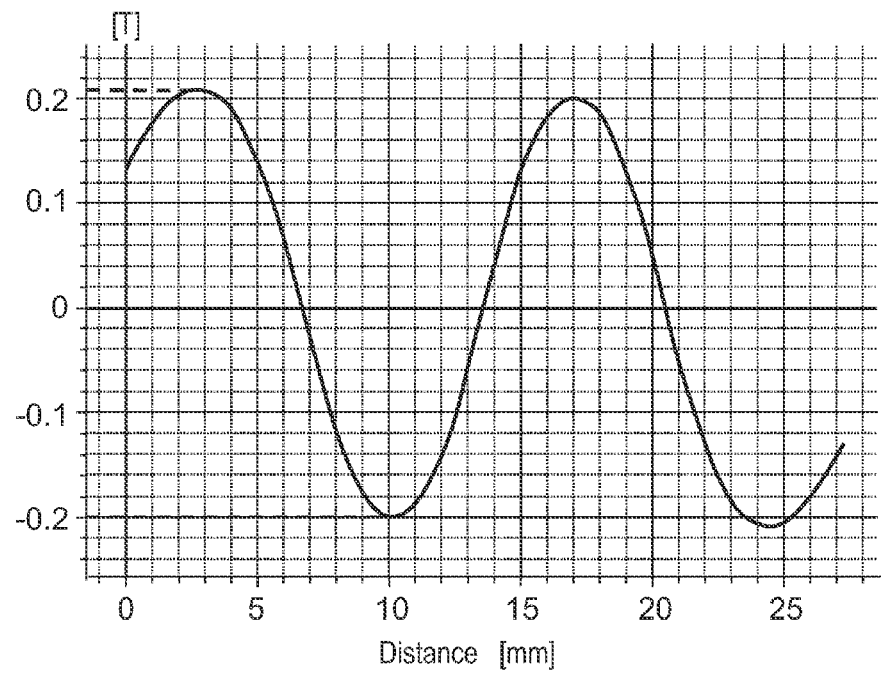
FIG. 11 is a graph showing magnetic flux density of the periodic magnetic field generator of the comparative example 1.

The magnetic flux density actually generated by periodic magnetic field generator 100a of this comparative example has been measured, and a result of which is described here by referring a graph of FIG. 11, as follows. The graph shown in FIG. 11 is the measurement result, wherein the horizontal axis represents distance along the X-axis from an edge of periodic magnetic field generator 100a, and the vertical axis represents magnetic flux density in the direction of Z-axis at locations of various distances. The same also applies to graphs of FIG. 12 and FIG. 13. It is known from FIG. 11 that upper and lower peak values of the magnetic flux density are −0.20 T and +0.21 T in periodic magnetic field generator 100a of this comparative example.

Embodiment 1

Figure 12:
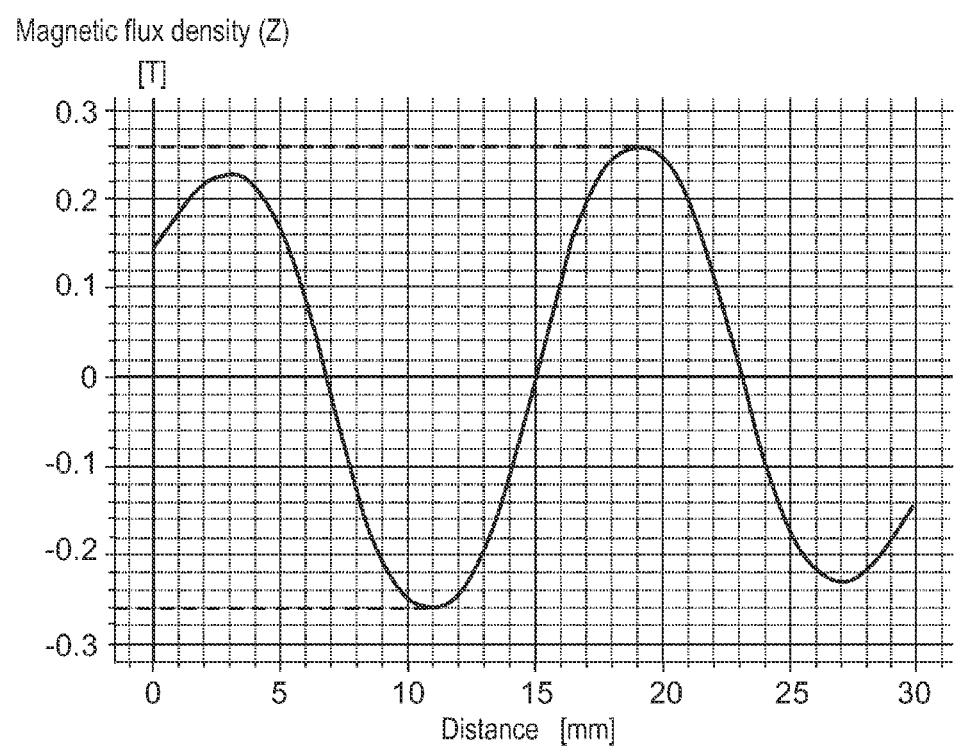
FIG. 12 is a graph showing magnetic flux density of a periodic magnetic field generator that represents embodiment 1.

FIG. 12 is a graph showing a result of measurement taken of magnetic flux density actually generated by periodic magnetic field generator 10a (embodiment 1) according to the first exemplary embodiment described above (refer to FIG. 1). It is known that upper and lower peak values of the magnetic flux density are −0.26 T and +0.26 T in periodic magnetic field generator 10a of this embodiment.

Embodiment 2

Figure 13:
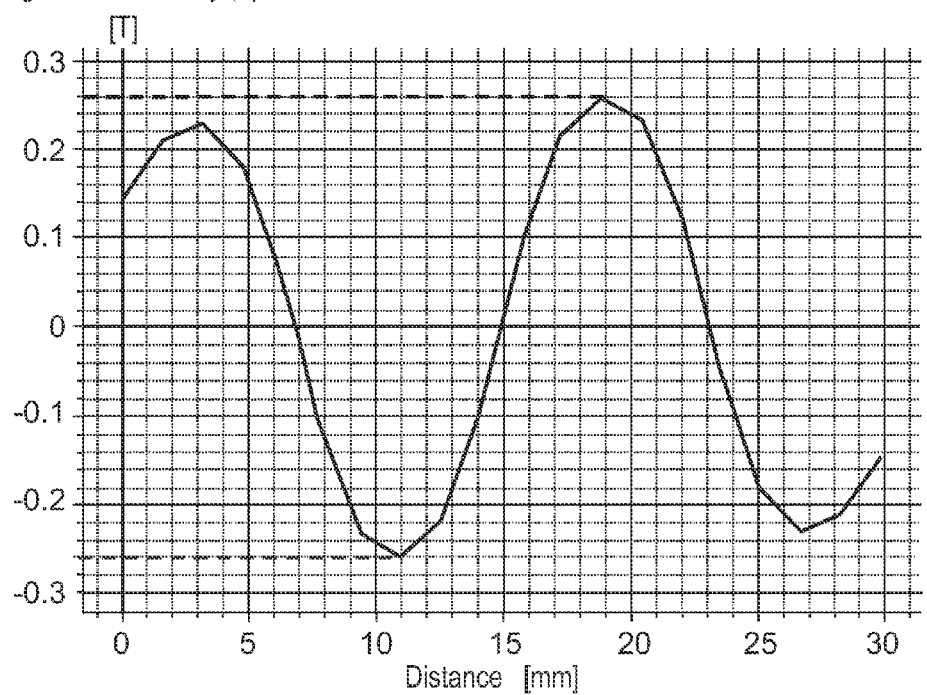
FIG. 13 is a graph showing magnetic flux density of a periodic magnetic field generator that represents embodiment 2.

FIG. 13 is another graph showing a result of measurement taken of magnetic flux density actually generated by periodic magnetic field generator 20a (embodiment 2) according to the third exemplary embodiment described above (refer to FIG. 8). It is known in periodic magnetic field generator 20a of this embodiment that upper and lower peak values of the magnetic flux density are −0.26 T and +0.26 T, which is same as the result of the embodiment 1.

[Result of Comparison]

It is apparent from the result of measurement of the magnetic flux density of the above embodiments 1 and 2 and comparative example 1 that the magnetic flux density in the direction of Z-axis increases by virtue of the structures of the above-described first and second exemplary embodiments, as compared to the structure of the comparative example 1. It is known that the above embodiments can provide the periodic magnetic field generators with capabilities of producing the magnetic flux density in any desired direction higher than before without increasing the volume and weight of the permanent magnets by virtue of their simple structures.

[Distribution Simulation for Lines of Magnetic Force of Actuator]

Description is provided next about a result of simulation on distribution of lines of magnetic force generated by actuators including the individual periodic magnetic field generators of the above exemplary embodiments by using embodiments 3 to 5 and comparative example 2 as follows.

Comparative Example 2

Figure 14:
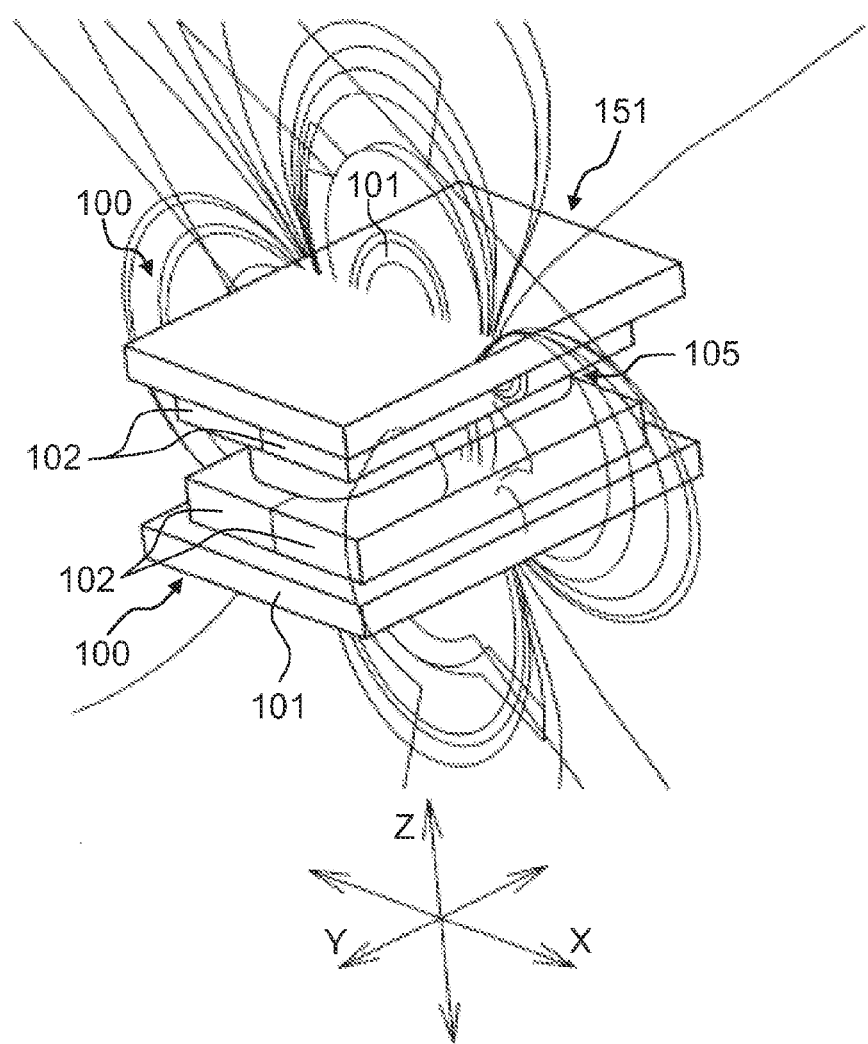
FIG. 14 is a simulation sketch showing distribution of lines of magnetic force of an actuator of comparative example 2.

Referring to FIG. 14, description is provided first of a result of simulation performed on distribution of lines of magnetic force actually generated by actuator 151 as comparative example 2 against actuators 51 to 53 according to the above-described second to fourth exemplary embodiments.

Actuator 151 of this comparative example is configured from two periodic magnetic field generators 100 disposed to confront each other vertically, and voice coil 105 placed between magnetic field generators 100, as shown in FIG. 14. Each of periodic magnetic field generators 100 is constructed as a fundamental unit of periodic magnetic field generator 100a shown in FIG. 10, and it includes two main permanent magnets 102 disposed on back yoke 101 as shown in FIG. 14.

Actuator 151 of this comparative example is provided with periodic magnetic field generators 100 described above, and it generates lines of magnetic force in both the directions of X-axis and Z-axis, as shown in FIG. 14. It has been known according to the result of simulation on actuator 151 that lines of strong magnetic force are generated not only in the direction of Z-axis where high magnetic flux density is desired, but also in the direction of X-axis to the same magnitude as the Z-axis, as shown in FIG. 14.

Embodiment 3

Figure 15:
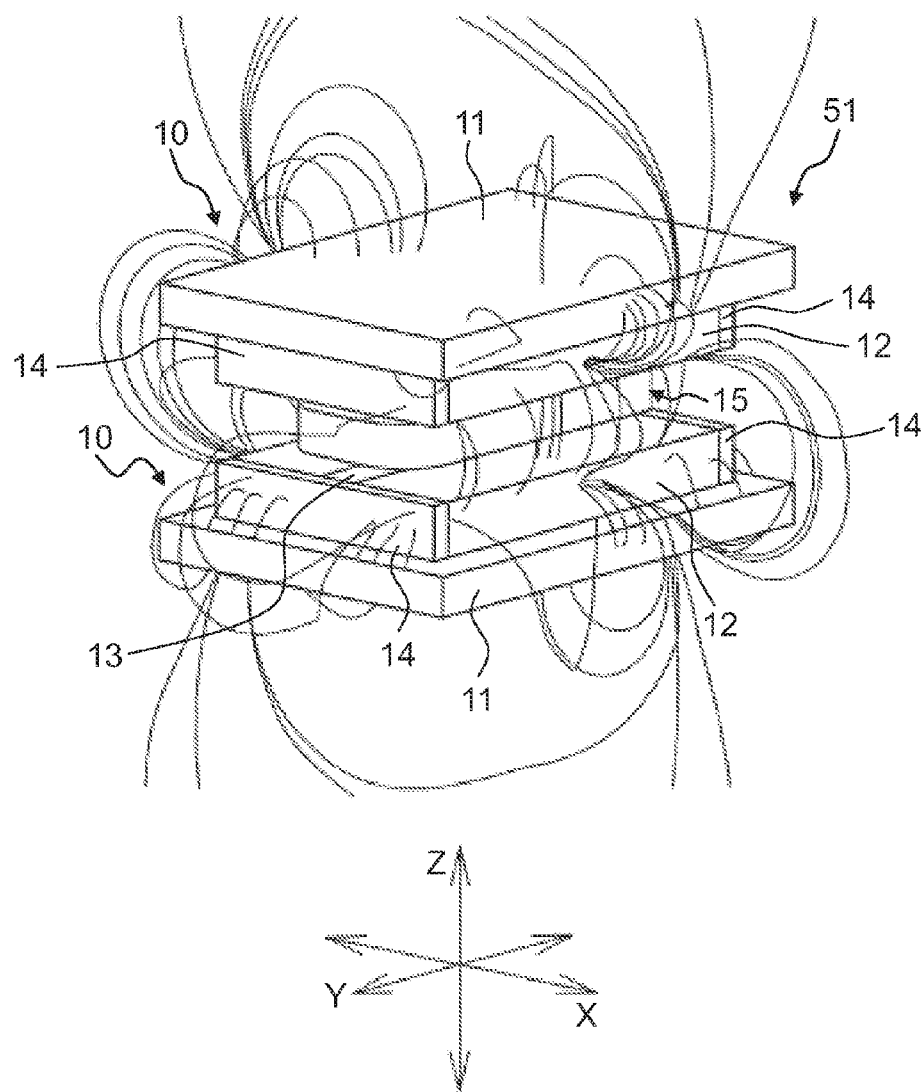
FIG. 15 is a simulation sketch showing distribution of lines of magnetic force of an actuator including a periodic magnetic field generator that represents embodiment 3.

FIG. 15 illustrates a result of simulation for distribution of lines of the magnetic force actually generated by actuator 51 (embodiment 3) according to the above-described second exemplary embodiment (refer to FIG. 6A et al.). Note that the simulation result shown in FIG. 15 is the examination made on distribution of the lines of magnetic force generated by actuator 51 including the fundamental units of periodic magnetic field generator 10a.

It has been known according to the simulation result shown in FIG. 15 that the lines of magnetic force in the direction of Z-axis is larger than the lines of magnetic force in the direction of X-axis when compared to comparative example 2 shown in FIG. 14.

This is considered to be attributed to the effect of the structure of periodic magnetic field generator 10 (i.e., side permanent magnets 14 that cover the end faces of main permanent magnets 12 and auxiliary permanent magnet 13, to be specific) described in the first exemplary embodiment.

Embodiment 4

Figure 16:
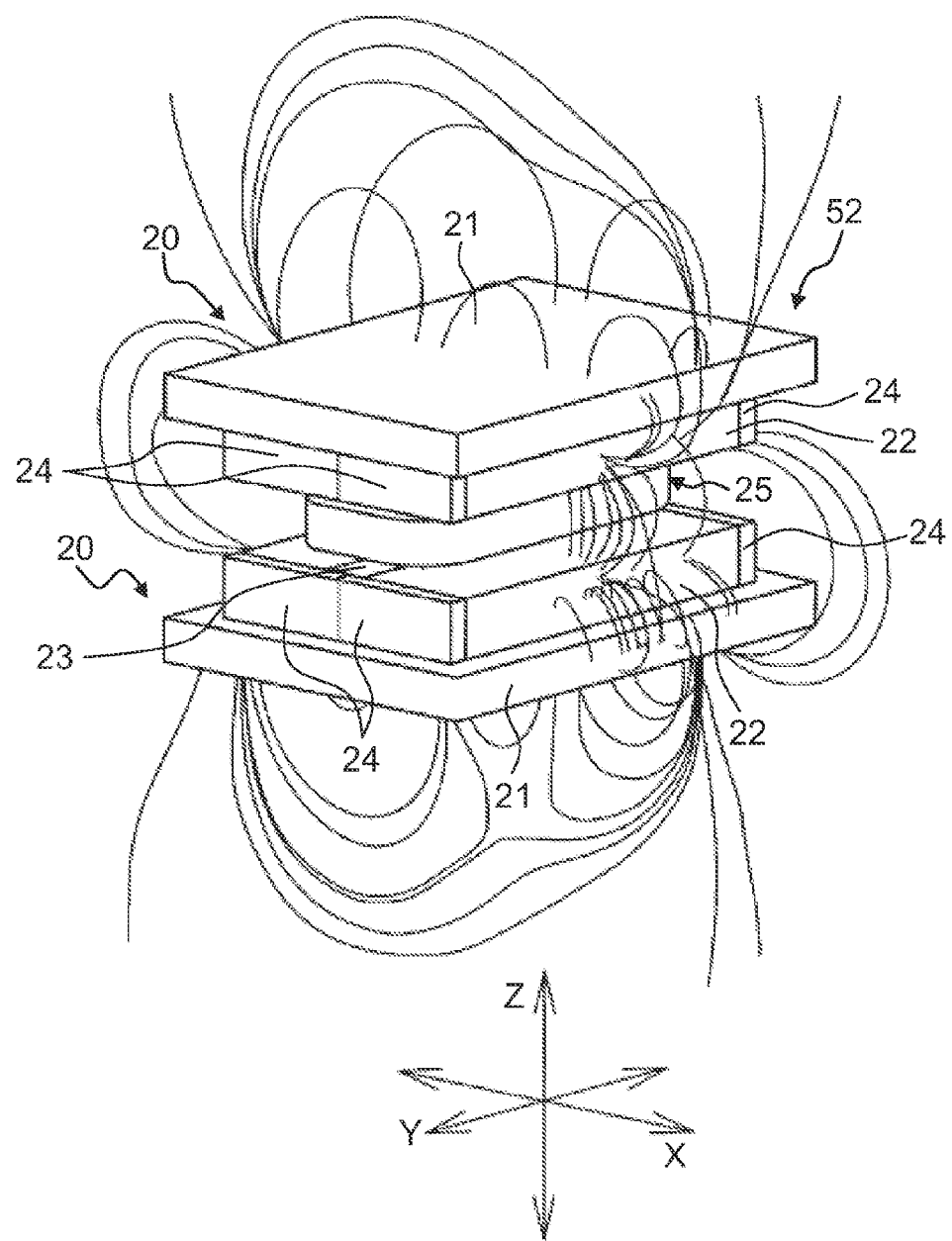
FIG. 16 is a simulation sketch showing distribution of lines of magnetic force of an actuator including a periodic magnetic field generator that represents embodiment 4.

FIG. 16 illustrates a result of simulation for distribution of lines of the magnetic force actually generated by actuator 52 (embodiment 4) constructed with the fundamental units of periodic magnetic field generator 20a according to the above-described third exemplary embodiment (refer to FIG. 8). Note that the simulation result shown in FIG. 16 is the examination made on distribution of the lines of magnetic force generated by actuator 52 including the fundamental units (i.e., periodic magnetic field generators 20) of periodic magnetic field generator 20a. Here, each of periodic magnetic field generators 20 is configured from two main permanent magnets 22, one auxiliary permanent magnet 23, and four side permanent magnets 24 disposed on back yoke 21. Furthermore, periodic magnetic field generator 20 included in actuator 52 of this embodiment is different in the orientations of magnetization of individual side permanent magnets 14 and 24, as compared to periodic magnetic field generator 10 included in actuator 51 of the embodiment 3 shown in FIG. 15, as has been stated previously.

Similar to the embodiment 3, it has been known according to the simulation result shown in FIG. 16 that the lines of magnetic force in the direction of Z-axis is larger than the lines of magnetic force in the direction of X-axis when compared to comparative example 2 shown in FIG. 14.

This is considered to be attributed to the effect of the structure of periodic magnetic field generator 20a (i.e., side permanent magnets 24 that cover the end faces of main permanent magnets 22 and auxiliary permanent magnets 23, to be specific) described in the third exemplary embodiment.

Embodiment 5

Figure 17:
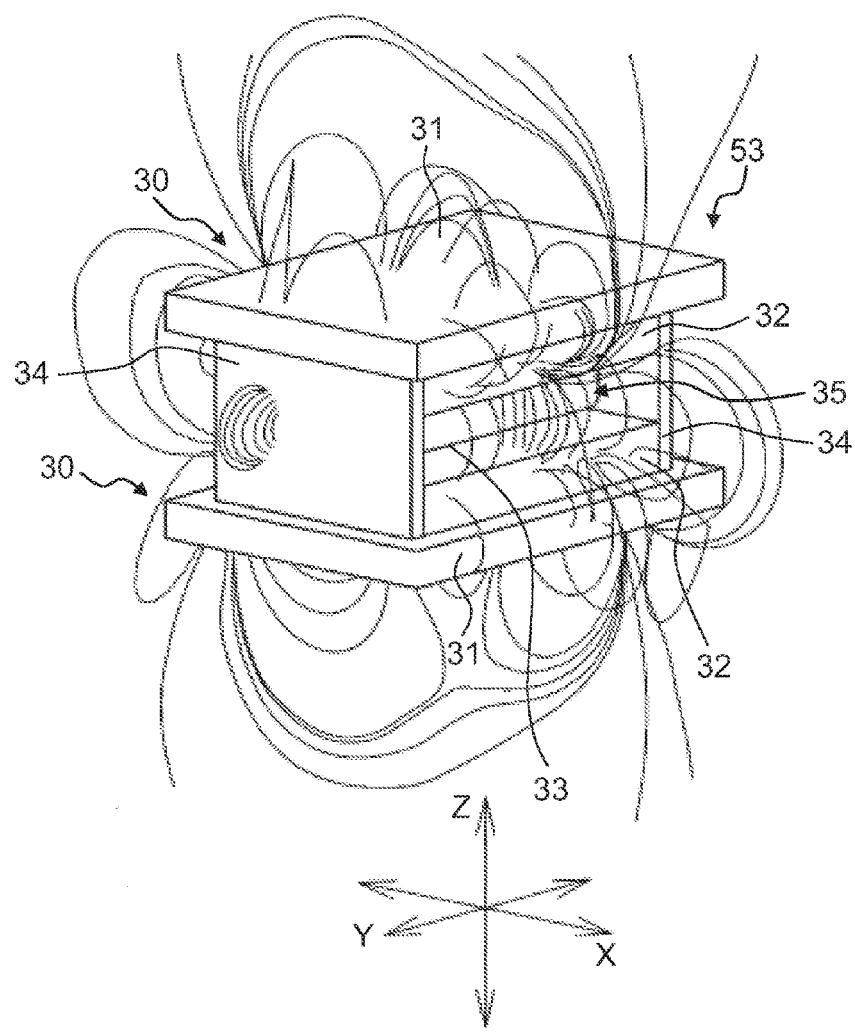
FIG. 17 is a simulation sketch showing distribution of lines of magnetic force of an actuator including a periodic magnetic field generator that represents embodiment 5.

FIG. 17 illustrates a result of simulation for distribution of lines of the magnetic force actually generated by actuator 53 (embodiment 5) according to the above-described fourth exemplary embodiment (refer to FIG. 9A to FIG. 9C). Periodic magnetic field generators 30 included in actuator 53 of this embodiment are different when compared to periodic magnetic field generators 10 included in actuator 51 of the embodiment 3 shown in FIG. 15 in an aspect that side permanent magnets 34 are used as common components between periodic magnetic field generators 30 on the upper and lower sides. That is, in actuator 53 of this embodiment 5, the upper and lower end faces in the direction of Z-axis of side permanent magnets 34 are in contact to upper and lower back yokes 31, as described in the fourth exemplary embodiment. Side permanent magnets 34 are disposed in such positions that they are also in contact to the end faces of main permanent magnets 32 and auxiliary permanent magnets 33.

Similar to the embodiment 3, it has been known according to the simulation result shown in FIG. 17 that the lines of magnetic force in the direction of Z-axis is larger than the lines of magnetic force in the direction of X-axis when compared to comparative example 2 shown in FIG. 14.

This is considered to be attributed to the effect of the structure of periodic magnetic field generators 30 (i.e., side permanent magnets 34 that cover the end faces of main permanent magnets 32 and auxiliary permanent magnets 33, to be specific) described in the fourth exemplary embodiment.

[Results of the Comparison]

Description is provided here about the comparison made between driving forces (i.e., thrust in N) generated by actuators 51, 52 and 53 including magnetic field generators 10, 20 and 30 according to the third to the fifth exemplary embodiments described above and a driving force (i.e., thrust in N) generated by actuator 151 including periodic magnetic field generator 100 as the comparative example 2, by using the table in FIG. 18.

That is, the thrust generated by the structure of the embodiment 3 was 0.7373(N) as shown in FIG. 18. Thus, it has been known that the thrust comes to be 113.2% as compared to the thrust of 0.6514(N) generated by the structure of the comparative example 2, resulting in an improvement of about 13%.

Next, the thrust generated by the structure of the embodiment 4 was 0.7487(N). It has been thus known that the thrust comes to be 114.9% of the thrust of 0.6514(N) generated by the structure of the comparative example 2, resulting in an improvement of about 15%.

Furthermore, the thrust generated by the structure of the embodiment 5 was 0.7628(N). It has been thus known that the thrust comes to be 117.1% of the thrust of 0.6514(N) generated by the structure of the comparative example 2, which is an improvement of about 17%.

It has been known from the above results that the driving forces (thrust) of actuators 51, 52 and 53 have been improved by about 13 to 17% by virtue of the structures of the embodiments 3 to 5, when compared to the conventional structure shown as the comparative example 2.

Accordingly, the structures of periodic magnetic field generators 10, 20 and 30 described in the above first through fourth exemplary embodiments can increase the magnetic flux density in the direction of Z-axis without increasing the volume of the permanent magnets.

Other Exemplary Embodiments

Although the first through the fourth exemplary embodiments have been described into specific details, the present disclosure is not intended to set a limitation by the above embodiments such that various changes and modifications may be made without departing from the scope of the disclosure.

[A]

In the above first exemplary embodiment, description has been provided as an example of periodic magnetic field generator 10a having a plurality of main permanent magnets 12 disposed at both ends in the X-axis, and side permanent magnets 14 disposed at both ends in the Y-axis so as to cover end faces 12b and 13b of main permanent magnets 12 and auxiliary permanent magnet 13, as shown in FIG. 1. The present disclosure is not limited to this example, however.

Figure 19A:
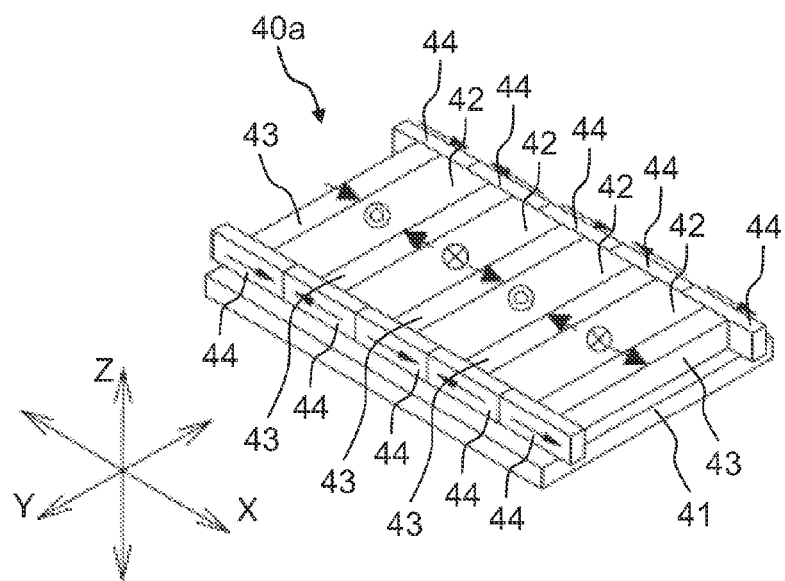
FIG. 19A and FIG. 19B are perspective views showing overall structures of periodic magnetic field generators according to other exemplary embodiments.

Also acceptable, for example, is periodic magnetic field generator 40a having auxiliary permanent magnet 43 disposed additionally at an outer side of each of main permanent magnets 42 disposed at both ends in the X-axis on back yoke 41, and end faces at one side of main permanent magnets 42 and auxiliary permanent magnets 43 covered with five pieces of side permanent magnets 44 that are magnetized alternately in opposite orientations along the direction of X-axis, as shown in FIG. 19A. In this structure, both the end faces of main permanent magnets 42 and auxiliary permanent magnets 43 in the Y-axis are covered with side permanent magnets 44, and both side faces of main permanent magnets 42 in the X-axis are covered completely with auxiliary permanent magnets 43. Note that a fundamental unit of periodic magnetic field generator 40a is configured from two main permanent magnets 42, three auxiliary permanent magnets 43, and six side permanent magnets 44 disposed on back yoke 41.

In this case, magnetic flux density that leaks from both the directions of X-axis and Y-axis can be reduced and magnetic flux density in the direction of Z-axis improved in the like manner as the structures of the individual exemplary embodiments described above by virtue of single piece of side permanent magnet 44 which is so disposed as to cover the entire end face of auxiliary permanent magnet 43 and a part of the end face of main permanent magnet 42.

Figure 19B:
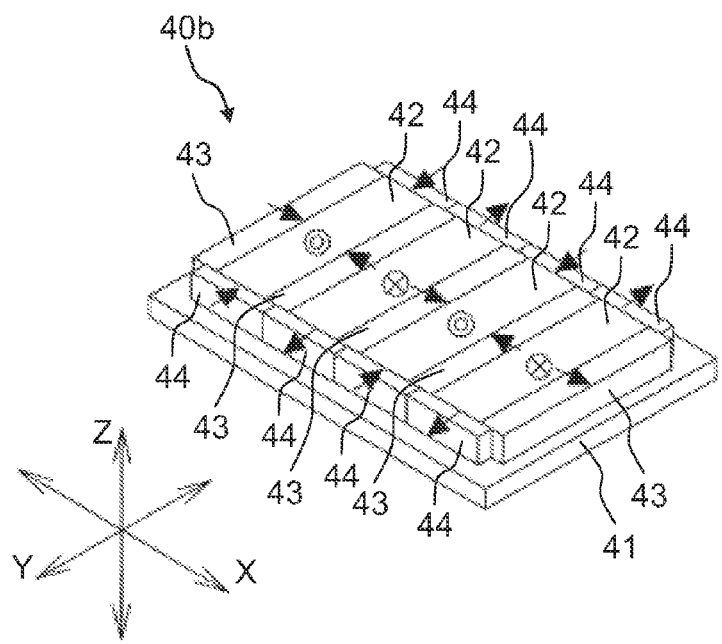

Moreover, when side permanent magnets 44 are magnetized in the orientation of Y-axis, the structure may be such that periodic magnetic field generator 40b further includes auxiliary permanent magnet 43 disposed at an outer side of each of main permanent magnets 42 disposed at both ends in the X-axis, and end faces at one side of main permanent magnets 42 and auxiliary permanent magnets 43 covered with four pieces of side permanent magnets 44 that are magnetized alternately into opposite orientations along the direction of Y-axis, as shown in FIG. 19B. Note that a fundamental unit of periodic magnetic field generator 40b is configured from two main permanent magnets 42, three auxiliary permanent magnets 43, and four side permanent magnets 44 disposed on back yoke 41.

In this case, similar advantageous effects can be achieved as those structures of the individual exemplary embodiments described above by virtue of the single piece of side permanent magnet 44 which is so disposed as to cover the entire end face of main permanent magnet 42 and a part of the end face of auxiliary permanent magnet 43.

[B]

In the above second exemplary embodiment, description has been provided as an example of actuator 51 having two equivalent periodic magnetic field generators 10 disposed to confront each other with voice coil 15 sandwiched between them in the Z-axis. The present disclosure is not limited to this example, however. The periodic magnetic field generators disposed to confront each other with voice coil 15 placed between them need not be limited to the equivalent structure, but they may have structures that are different in their orientations of magnetization between the upper and the lower side permanent magnets, for example.

Of the two periodic magnetic field generators disposed to confront vertically, only one side of them may have to be the periodic magnetic field generator of the present embodiment. In other words, one periodic magnetic field generator of the present embodiment is disposed at the lower side in the Z-axis, and a periodic magnetic field generator of the conventional structure may be disposed at the upper side. An actuator of high magnetic flux density in the direction of Z-axis can be obtained even in this case, as similar to that described above.

[C]

In each of the above exemplary embodiments, description has been provided of the example applicable to an actuator to be mounted to a camera-shake correction mechanism of an image-capturing device (digital camera). The present disclosure is not limited to this example, however. The present disclosure is also applicable as an actuator mounted to an automatic focus mechanism and a zoom mechanism of an image-capturing device, for example. In addition, the present disclosure may apply to various actuators mountable to robots, transport mechanisms such as stages, motors (linear motors), and the like devices.

INDUSTRIAL APPLICABILITY

Periodic magnetic field generators of the present disclosure are applicable widely to various actuators that are mounted to optical devices such as digital cameras (i.e., mechanism unit for camera-shake correction, automatic focus, zooming, etc.), robots, stages (transport mechanisms), motors (linear motors), and the like devices since the periodic magnetic field generators can provide such advantages as increasing magnetic flux density without increasing volumes and dimensions of the magnetic units.

What is claimed is:

1. A periodic magnetic field generator comprising:
   a flat-shaped first yoke;
   a plurality of main permanent magnets magnetized in a first direction of generating magnetic field, the direction being perpendicular to the first yoke, and disposed on the first yoke such that orientations of the magnetization become opposite alternately in the first direction;
   an auxiliary permanent magnet magnetized in a second direction perpendicular to side faces of the plurality of main permanent magnets, and placed between the side faces of the main permanent magnets on the first yoke; and
   a side permanent magnet magnetized in a third direction perpendicular to the first direction, and disposed on the first yoke so as to cover end faces of the main permanent magnets and the auxiliary permanent magnet, the end faces being perpendicular to the side faces of the main permanent magnets.

2. The periodic magnetic field generator of claim 1, wherein
   the side permanent magnet covers whole of an end face of the auxiliary permanent magnet and at least a part of end faces of the main permanent magnets, and
   the third direction is same direction as the second direction.

3. The periodic magnetic field generator of claim 1, wherein
   the side permanent magnet covers whole of end faces of the main permanent magnets and at least a part of an end face of the auxiliary permanent magnet, and
   the third direction is a direction perpendicular to both the first direction and the second direction.

4. The periodic magnetic field generator of claim 1, wherein the auxiliary permanent magnet covers whole of the side faces of the main permanent magnets.

5. An actuator comprising:
   the periodic magnetic field generator of claim 1; and
   a voice coil disposed in a space at an opposite side of the first yoke with respect to the main permanent magnets and the auxiliary permanent magnet.

6. The actuator of claim 5 configured to satisfy a relational expression (1), where C is an inner width of the voice coil, s is a range of driving stroke at both plus and minus sides, and t is a thickness of the auxiliary permanent magnet:

$$C > t + s \quad (1)$$

7. The actuator of claim 5 further comprising a second yoke so disposed as to sandwich the voice coil with the periodic magnetic field generator.

8. The actuator of claim 5 comprising two units of the periodic magnetic field generator, wherein the two periodic magnetic field generators are so disposed as to sandwich the voice coil.

9. The actuator of claim 8, wherein the two periodic magnetic field generators have structures that are equivalent to each other.

10. The actuator of claim 7, wherein the side permanent magnet is so disposed as to cover nearly whole of a space between the first yoke of the periodic magnetic field generator and the second yoke.

11. The actuator of claim 8, wherein the side permanent magnet is so disposed as to cover nearly whole of a space between the first yokes included individually in the two periodic magnetic field generators.

* * * * *